US012562826B2

(12) United States Patent
Civerolo et al.

(10) Patent No.: US 12,562,826 B2
(45) Date of Patent: Feb. 24, 2026

(54) DETECTING TONAL INTERFERENCE IN PHASE SHIFT KEYED SIGNAL MODULATIONS

(71) Applicant: Naval Information Warfare Center Pacific, San Diego, CA (US)

(72) Inventors: Michael Civerolo, Forney, TX (US); Akila Thumbiran, San Diego, CA (US); Chris Farrand, San Diego, CA (US); Quentin J Ward, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 72 days.

(21) Appl. No.: 18/734,387

(22) Filed: Jun. 5, 2024

(65) Prior Publication Data

US 2025/0379668 A1     Dec. 11, 2025

(51) Int. Cl.
H04B 17/345 (2015.01)
H04L 27/18 (2006.01)

(52) U.S. Cl.
CPC ............ H04B 17/345 (2015.01); H04L 27/18 (2013.01)

(58) Field of Classification Search
CPC .............................. H04B 17/345; H04L 27/18
See application file for complete search history.

(56) References Cited

U.S. PATENT DOCUMENTS

| | | | | | |
|---|---|---|---|---|---|
| 5,222,106 | A | * | 6/1993 | Satoh | .................... H04B 1/1027 455/340 |
| 5,563,537 | A | * | 10/1996 | Seta | ........................... H03J 7/02 455/75 |
| 2004/0022175 | A1 | * | 2/2004 | Bolinth | ................. H04L 1/0054 370/203 |
| 2019/0237042 | A1 | * | 8/2019 | Hu | ......................... G09G 5/008 |

* cited by examiner

*Primary Examiner* — Janice N Tieu
(74) *Attorney, Agent, or Firm* — Naval Information Warfare Center, Pacific; Kyle Eppele

(57) ABSTRACT

A method for detecting tonal interference in phase shift keyed signal modulations includes feeding a phase shift keyed signal with an error signal through a lock loop from a phase lock loop. The lock loop feeds the phase shift keyed signal with an error signal through a lock counter that counts a time for the error signal to measure a voltage below a minimum threshold. An enable signal is sent via the lock counter to the frequency channelizer module when the voltage drops below the minimum threshold. The frequency channelizer module splits a spectral content of the phase shift keyed signal into frequency channels. An output of the frequency channels is sent via the frequency channelizer module to a spectral anomaly processor. An automated test is performed with the spectral anomaly processor for each frequency channel, thereby determining a frequency or phase band of the tonal interference.

20 Claims, 7 Drawing Sheets

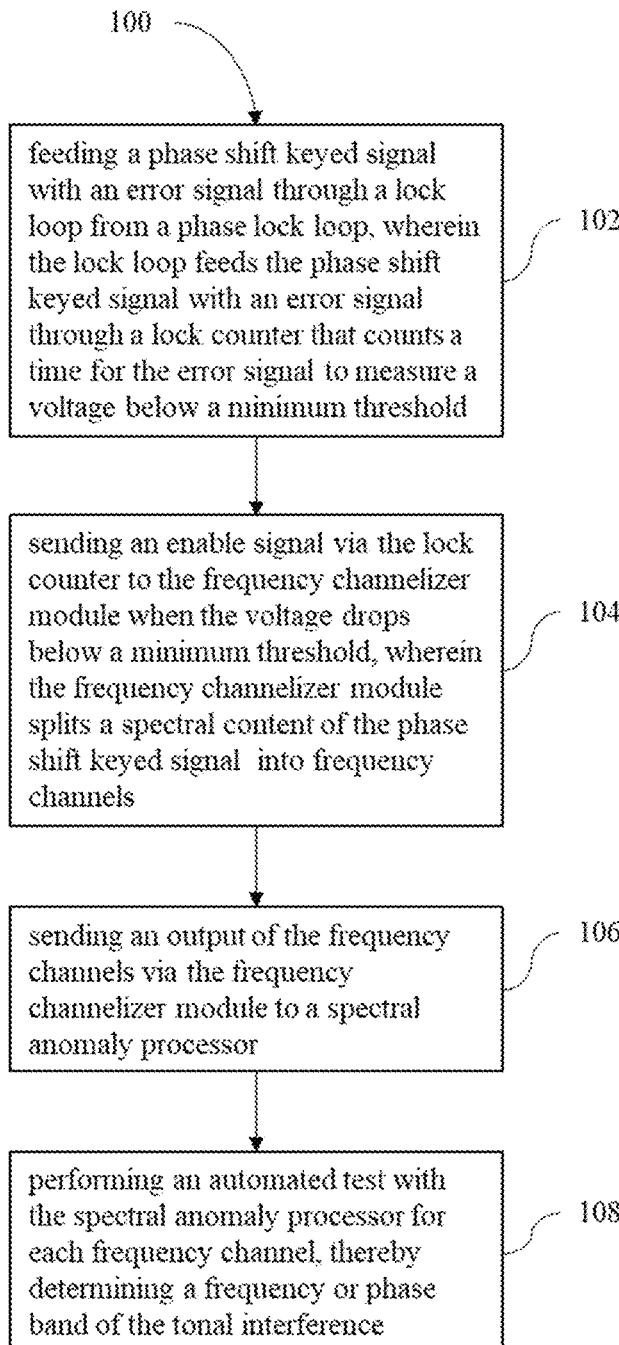

100 feeding a phase shift keyed signal with an error signal through a lock loop from a phase lock loop, wherein the lock loop feeds the phase shift keyed signal with an error signal through a lock counter that counts a time for the error signal to measure a voltage below a minimum threshold    102 sending an enable signal via the lock counter to the frequency channelizer module when the voltage drops below a minimum threshold, wherein the frequency channelizer module splits a spectral content of the phase shift keyed signal into frequency channels    104 sending an output of the frequency channels via the frequency channelizer module to a spectral anomaly processor    106 performing an automated test with the spectral anomaly processor for each frequency channel, thereby determining a frequency or phase band of the tonal interference    108

DETECTING TONAL INTERFERENCE IN PHASE SHIFT KEYED SIGNAL MODULATIONS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. Licensing and technical inquiries may be directed to the Office of Research and Technical Applications, Naval Information Warfare Center Pacific, Code 72120, San Diego, CA, 92152; (619) 553-5118; NIWC_Pacific_T2@us.navy.mil. Reference Navy Case Number 211652.

BACKGROUND

Phase shift keyed (PSK) digital modulation is prolific in both military and commercial applications. PSK digital modulation is one of the most common digital modulation schemes that is widely used. For example, PSK digital modulation is used in cellphones, WiFi, medical devices, military communications, and many other systems. PSK modulation relies on the purity of a phase shifted complex sine wave. For this reason, sinusoidal (tonal) interference can be detrimental to a PSK signal.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

FIG. 1 is an example of the method for detecting tonal interference in phase shift keyed signal modulations;

DETAILED DESCRIPTION

Traditional PSK wireless systems will use a frequency, phase lock loops, or both to ensure the system correctly adjusts to the frequency and phase of the incoming PSK signal carrier. The adjustment is performed after PSK signal conditioning and various filtering stages so that the only remaining spectral components of the PSK signal are the carrier and PSK signal information bandwidth. PSK signals have one dominant sinusoidal carrier component that is

Figure 2A:
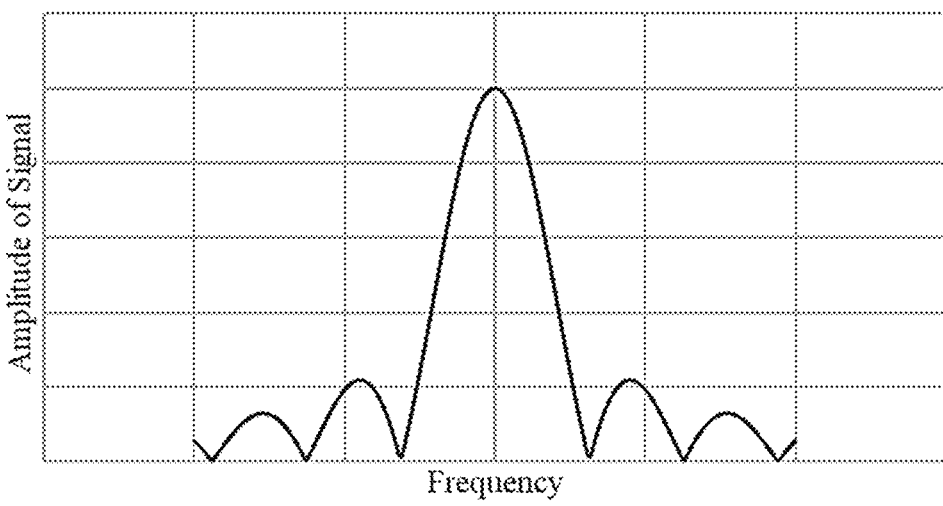
FIG. 2A-2B are examples of a phase shift keyed signal with and without tonal interference, respectively.
Figure 2B:
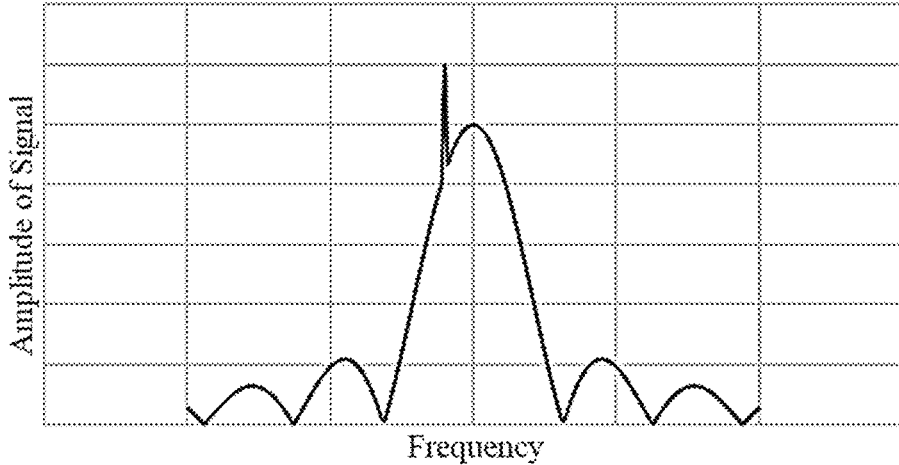

2 needed to lock onto before baseband conversion takes place. However, if a strong sinusoidal (tonal) interference signal is present within the information bandwidth of the PSK signal, the interference will not be removed by any of the filtering stages. The presence of two strong carrier signals (the desired carrier and an interfering tone) will result in the frequency, the phase lock loops, or both not being able to settle on one dominant frequency, thereby resulting in a poor PSK signal. An example of a PSK spectrum without and with tonal interference is shown in FIG. 2A and FIG. 2B, respectively. When tonal interference is present, there appears to be two dominant carrier signals as seen by the second spike peak in FIG. 2B. This is the cause of the frequency, the phase lock loops, or both not being able to settle on one dominant frequency.

In PSK signals, in-band tonal interference often goes undetected and is therefore difficult to remove. In-band tonal interference is not detected and removed from the typical digital and analog filtering steps of a PSK signal. Tonal interference can be particularly damaging and undetectable in PSK signals as the interference affects multiple demodulation stages, such as phase locking, frequency locking, decision boundaries, matched filtering, etc. Tonal interference is removed or avoided in current systems by abandoning the channel by switching center frequencies, increasing the power to overpower the interference, or decreasing the data rate to reduce the signal-to-noise requirements. However, none of the current methods includes finding the frequency of the tonal interference. Current methods merely avoid or overpower the tonal interference.

The method and system herein detects the frequency location of an unwanted tonal interference signal that is within the information bandwidth of a PSK signal. By detecting the frequency of the tonal interference, PSK systems can have an opportunity to eliminate loud tone interference altogether to avoid unwanted tonal interference. Since the frequency or phase locking time of a given PSK system is known, a threshold time can be set to determine the presence of tonal interference in a PSK signal. Once the presence of tonal interference is determined, the frequency spectrum of the PSK signal can be analyzed to determine the frequency of the tonal interference.

The method herein for detecting tonal interference in phase shift keyed signal modulations includes feeding a phase shift keyed signal with an error signal through a lock loop from a phase lock loop. The lock loop feeds the phase shift keyed signal with an error signal through a lock counter that counts a time for the error signal to measure a voltage below a minimum threshold. An enable signal is sent via the lock counter to the frequency channelizer module when the voltage drops below the minimum threshold. The frequency channelizer module splits a spectral content of the phase shift keyed signal into frequency channels. An output of the frequency channels is sent via the frequency channelizer module to a spectral anomaly processor. An automated test is performed with the spectral anomaly processor for each frequency channel, thereby determining a frequency or phase band of the tonal interference.

Referring now to FIG. 1, the method 100 includes feeding a PSK signal with an error signal through a lock loop from a phase lock loop, where the lock loop feeds the PSK signal with an error signal through a lock counter that counts a time for the error signal to measure a voltage below a minimum threshold 102. A PSK signal has an error signal when tonal interference is present. As previously stated, the presence of two strong carrier signals (the desired carrier signal and an interfering tone) will result in the frequency, the phase lock loops, or both not being able to settle on one dominant frequency, thereby creating the error signal. In an example, the error signal is DC voltage that is relative to the frequency or phase error. In one example, the minimum threshold is a set voltage threshold that the lock counter begins counting the time for the error signal to go below the minimum voltage threshold, which is indicated by a voltage error percentage that allows the system to continue functioning properly. In another example, the minimum threshold is a set frequency or phase threshold where the voltage correlates to a specific frequency or phase and the lock counter begins counting the time for the error signal to go below the minimum frequency or phase threshold, which is a frequency or phase error percentage that allows the system to continue functioning properly. Once the phase lock loop or frequency lock loop locks, the error signal is zero or about zero. The value of the minimum threshold, regardless of whether the minimum threshold is a voltage, frequency, or phase threshold, is system and application dependent. In an example, the minimum threshold is a signal error that is equal to or greater than a 1% voltage, phase, or frequency error. Therefore, in an example, the lock counter counts the time for the error signal to go below 1%, meaning the error signal is no longer present and below the minimum threshold. In another example, 3GPP TS 36.104 allows up to 12.5% phase error for 16-QAM and up to 8% phase error for 64-QAM. As a result, the minimum threshold would be a signal error that is equal to or greater than 12.5% phase error for 16-QAM and up to 8% phase error for 64-QAM. Therefore, depending on the system and application will dictate the minimum threshold value.

Figure 3:
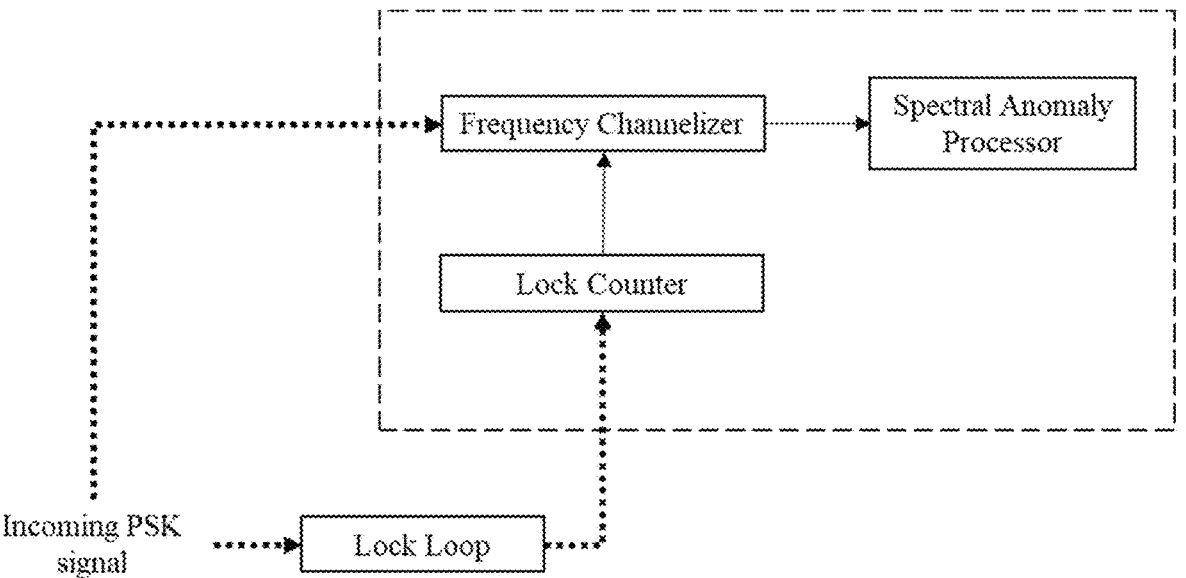
FIG. 3 is an example of a tonal interference detector system described herein.

FIG. 3 shows an example of a tonal interference detector system. As shown, the incoming PSK signal is fed into the lock loop. The incoming PSK signal is fed from a phase lock loop or frequency lock loop. Any known type of frequency or phase lock loop may be used in the tonal interference detector system. Some examples of the phase lock loop include a fractional or integer-n pll, a integrated vco pll, a translation loop pll, or an analog or software phase lock loop. The lock loop then feeds a lock counter when the PSK signal with an error signal is present. In one example, the PSK signal is fed through the lock counter when the PSK signal is above the minimum threshold for a system specific amount of time due to the presence of two strong carrier signals. In another example, the PSK signal with the error signal is fed through the lock counter when the phase shift keyed signal with an error signal is unable to lock.

Figure 4:
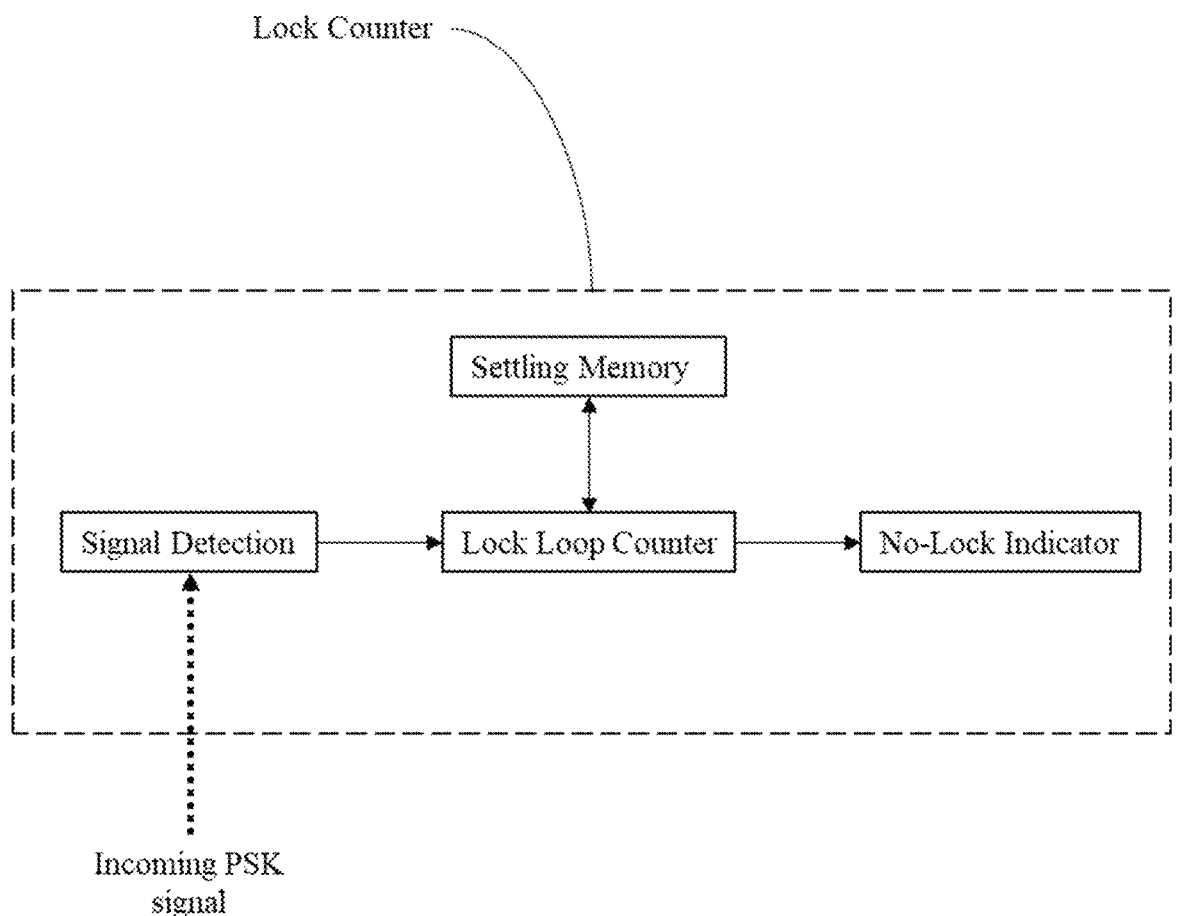
FIG. 4 is an example of a lock counter within a tonal interference detector system described herein.

An example of the lock counter is shown in FIG. 4. The frequency or phase lock loop feeds the PSK signal through the lock counter. In an example, the lock counter may be any type of digital counter that counts clock cycles until the phase lock loop or frequency lock loop locks indicating the error in the loop is below the minimum threshold. In one example, once the lock counter detects the PSK signal with the error signal, the lock counter counts a time for the error signal to measure a voltage below a minimum threshold. In another example, once the lock counter detects the PSK signal with the error signal, the lock counter counts the time for the error signal to measure a frequency or phase below the minimum threshold by converting the voltage to a corresponding frequency or phase. In one example, when a new signal is detected, the lock counter resets the time to zero after the error signal measures a voltage, frequency, or phase below the minimum threshold. In another example, the lock counter resets the time to zero when the error signal goes above the minimum threshold.

Figure 5A:
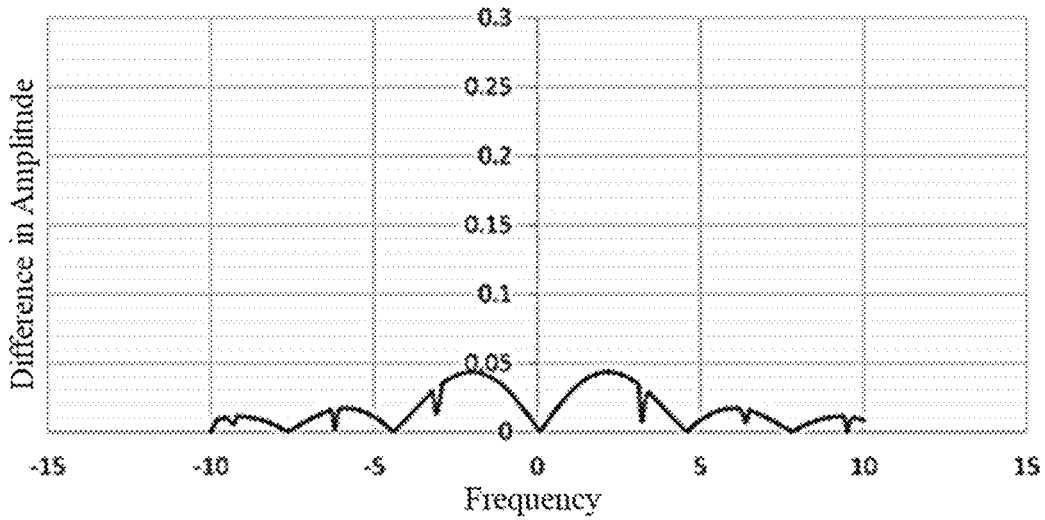
FIGS. 5A and 5B are examples of a moving average of a phase shift keyed signal without and with tonal interference, respectively.
Figure 5B:
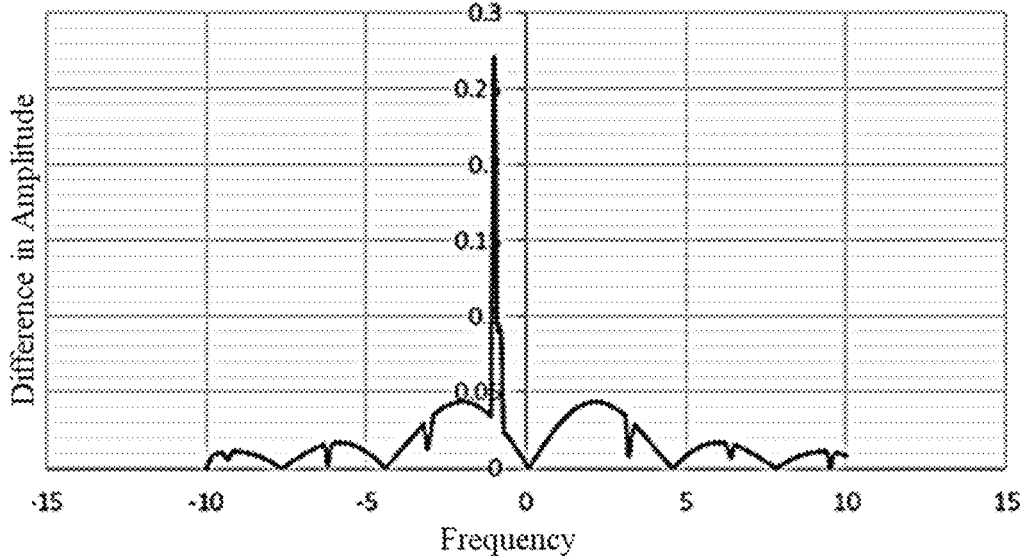

Referring back to FIG. 4, the lock counter also includes a settling memory that contains a system specific minimum threshold stored for the tonal interference detector system. As previously stated herein, the minimum threshold value can be a voltage, phase, or frequency specific value. The minimum threshold can also be a dynamic value or static value. In an example, when the minimum threshold is a dynamic value, the dynamic value is any sample moving average. For example, the dynamic sample moving average may be a 3 sample moving average, a 6 sample moving average, a 9 sample moving average, etc. The minimum threshold as a dynamic sample moving average makes the tonal interference in a PSK signal more prevalent and easier to locate. FIGS. 5A and 5B show an example of a PSK signal without tonal interference and with tonal interference, respectively. The tonal interference in FIG. 5B is clearly visible with a spike in the difference in amplitude between the slow and fast moving averages. In another example, the stored dynamic value can be continuously updated or include a table of stored minimum threshold values for reference. When the settling memory has a stored static value, the minimum threshold value is a system specific value that does not change. Once the minimum threshold stored in the settling memory is exceeded by the error signal, the lock counter feeds the PSK signal to the no-lock indicator, which is another component of the lock counter. The no-lock indicator then sends the enable signal to the frequency channelizer module when the minimum threshold is exceeded by the error signal to activate the frequency channelizer module.

Referring back to FIG. 1, the method 100 includes sending an enable signal via the lock counter to the frequency channelizer module when the voltage drops below a minimum threshold 104. The frequency channelizer module splits a spectral content of the PSK signal into frequency channels. The number of frequency channels the frequency channelizer module splits the spectral content into varies depending on the PSK system and application. The number of frequency channels can be as many as possible while still allowing the PSK system to be functional. For example, two or more frequency channels may be used. In an example, the frequency channelizer module splits the spectral content into frequency channels of equal portions. For example, a 100 MHz wide PSK signal split into 50 frequency channels where each frequency channel is 2 MHz. In another example, a 100 kHz PSK signal may be split into 20 frequency channels of 5 kHz each. The frequency channelizer module is able to determine if the signal error is due to noise or tonal interference by splitting the spectral content into multiple channels. If the signal error is due to noise, the noise will be present in all of the frequency channels. If the signal error is due to tonal interference, only one frequency channel will have a spike in the frequency spectrum (i.e., a greater amount of power compared to the other frequency channels), thereby indicating tonal interference. The amount of power in the spike varies depending on the PSK signal and PSK system as well as the strength of the tonal interference. In an example, any spike in power greater than any Gaussian additive noise power indicates tonal interference. An example of this is shown in FIG. 5B, as previously discussed herein. The spectral content is the entire frequency band of the PSK signal. Therefore, the number of frequency channels depends on the frequency band of the PSK signal as previously stated herein.

Referring back to FIG. 3, the tonal interference detector system includes the frequency channelizer module. The frequency channelizer module also receivers the incoming PSK signal directly along with the lock loop. However, the frequency channelizer module is not powered on and actively splitting the spectral content of the PSK signal into frequency channels until an enable signal is received from the lock counter. Once the frequency channelizer module is enabled, an output of each frequency channel is sent to the spectral anomaly processor as shown in FIG. 3. Any type of frequency channelizer module may be used. Some examples of the frequency channelizer module include fast fourier transform (FFT), two or more bandpass filters, or a poly-phase channelizer.

Referring back to FIG. 1, the method 100 includes sending an output of the frequency channels via the frequency channelizer module to a spectral anomaly processor 106. The spectral anomaly processor performs an automated test for each frequency channel, thereby determining a frequency or phase band of the tonal interference 108. Similar to the frequency channelizer module, the spectral anomaly processor is powered on when the enable signal is sent from the lock counter. Any type of spectral anomaly processor may be used. Some examples of the spectral anomaly processor include a microcontroller or a field programmable gate array (FPGA) that are programmed to perform the functions of the spectral anomaly processor.

The automated test determines if the PSK signal has tonal interference present and a frequency band that the tonal interference is located. In an example, this is determined by comparing each frequency channel with a known clean version, putting a amplitude trigger or threshold detector in each frequency channel, or feeding each frequency channel through a high pass filter to show any sudden changes in frequency (i.e., indicating tonal interference). In another example, a fast-moving average, a slow moving-average, or a combination thereof can be calculated, a moving average difference to create a stream of difference values can be calculated, and the stream of difference values are compared with the minimum threshold. In yet another example, a combination of the tests may be used. Specific examples of the automated test by the spectral anomaly processor are shown in FIG. 6 and FIG. 7.

Figure 6:
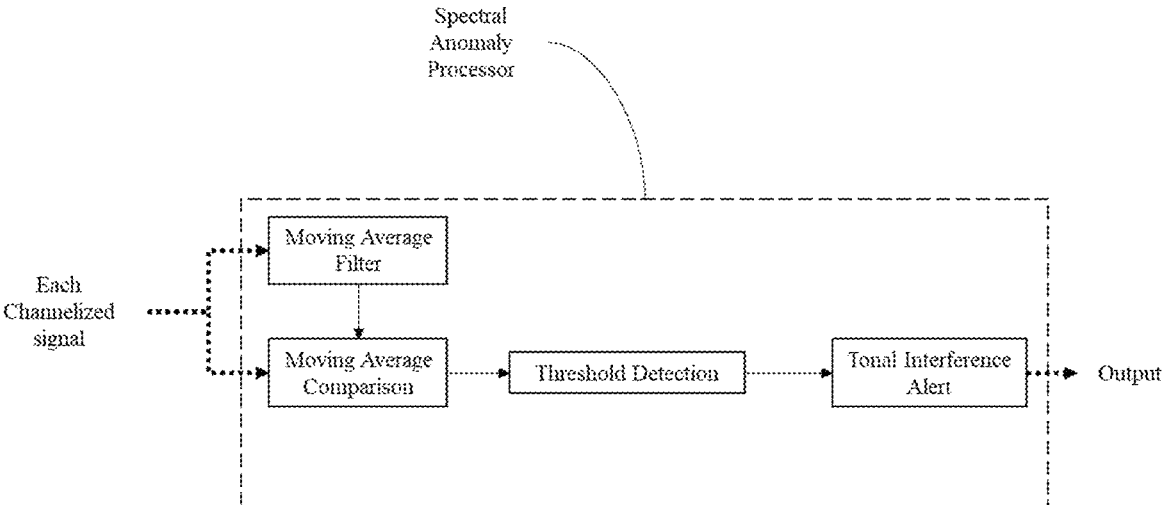
FIG. 6 is an example of an automated test performed by the spectral anomaly processor within the tonal interference detector system described herein.

In the example in FIG. 6, an automated test performed by the spectral anomaly processor is shown. In this example, each frequency channel of the PSK signal is fed through a moving average filter. The channelized PSK signal that is passed through the moving average filter is also converted to a moving average and compared to the filtered moving average. When tonal interference is present, the spectral anomaly processor provides an alert to a user interface as an output. Any known way to provide an alert to a user interface as an output may be used. In one example, the alert is provided in the form of a voltage band of the tonal inter-ference, which corresponds to a specific frequency band or phase band. In other examples, the alert is provided directly as a frequency band or phase band. In an example, the user interface may be a computer. In this example, the voltage of the tonal interference would show on a screen of the computer using software programming.

Figure 7:
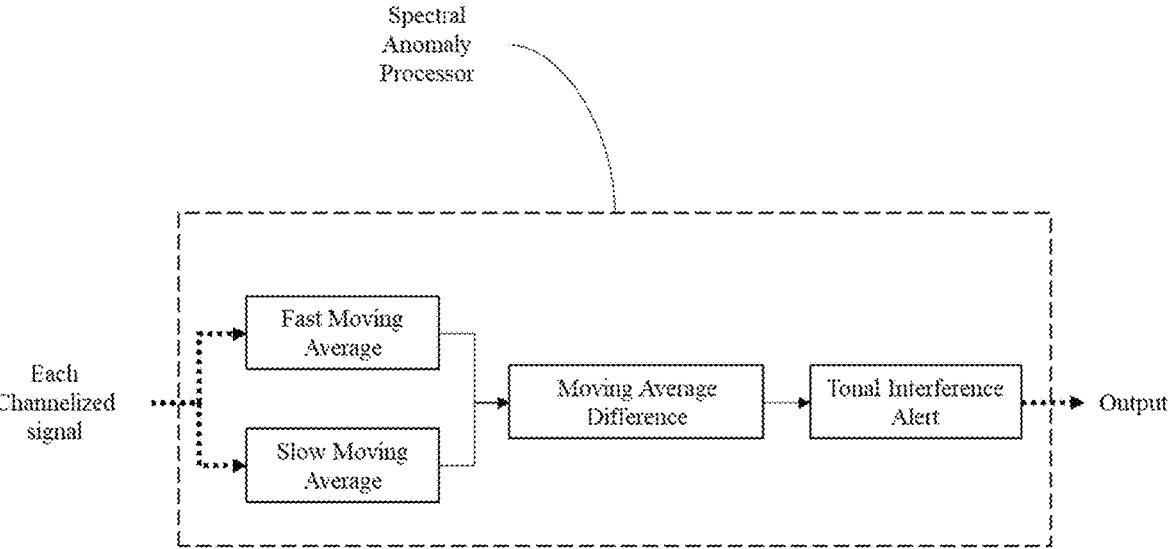
FIG. 7 is another example of an automated test performed by the spectral anomaly processor within the tonal interference detector system described herein.

In another example in FIG. 7, another example of the automated test performed by the spectral anomaly processor. In this example, each frequency channel of the PSK signal has two moving averages calculated. A slow moving average and a fast moving average are calculated. In an example, the slow moving average is a six sample moving average of the frequency channel of the PSK signal and the fast moving average is a three sample moving average of the frequency channel of the PSK signal. In another example, the fast and slow moving averages may be any number of samples as long as the slow moving average is a higher sample number than the fast moving average. A moving average difference to create a stream of difference values is then calculated from the fast moving average and slow moving average with each frequency channel of the PSK signal. The stream of difference values is then compared to the minimum threshold. When tonal interference is present, the spectral anomaly processor provides an alert to a user interface as an output. In one example, the alert is provided in the form of the voltage band of the tonal interference, which corresponds to a specific frequency band or phase band. In other examples, the alert is provided directly as a frequency band or phase band. In an example, the user interface may be a computer processor.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 0.1 to about 20 should be interpreted to include not only the explicitly recited limits of from about 0.1 to about 20, but also to include individual values, such as 3, 7, 13.5, etc., and sub-ranges, such as from about 5 to about 15, etc.

In describing and claiming the examples disclosed herein, the singular forms "a", "an", and "the" include plural referents unless the context clearly dictates otherwise.

What is claimed is:

1. A method for detecting tonal interference in phase shift keyed signal modulations, comprising:

feeding a phase shift keyed signal with an error signal through a lock loop from a phase lock loop, wherein the lock loop feeds the phase shift keyed signal with the error signal through a lock counter that counts a time for the error signal to measure a voltage below a minimum threshold;

sending an enable signal via the lock counter to a frequency channelizer module when the voltage drops below the minimum threshold, wherein the frequency channelizer module splits a spectral content of the phase shift keyed signal into frequency channels;

sending an output of the frequency channels via the frequency channelizer module to a spectral anomaly processor; and performing an automated test with the spectral anomaly processor for each frequency channel, thereby determining a frequency or phase band of the tonal interference.

2. The method of claim 1, wherein the lock loop feeds the phase shift keyed signal with the error signal through the lock loop when the phase shift keyed signal is below the minimum threshold.

3. The method of claim 1, wherein the lock counter that counts the time for the error signal to measure the frequency or phase below the minimum threshold.

4. The method of claim 3, wherein the lock counter resets the time to zero after the error signal measures a frequency or phase below the minimum threshold when a new signal is detected or after the error signal goes above the minimum threshold.

5. The method of claim 1, wherein the lock loop includes a settling memory that contains the minimum threshold.

6. The method of claim 5, wherein the minimum threshold is a dynamic value or static value.

7. The method of claim 5, wherein the lock loop includes a no-lock indicator that sends the enable signal to the frequency channelizer module when the minimum threshold is exceeded by the error signal.

8. The method of claim 1, wherein the frequency channelizer module and the spectral anomaly processor are powered on when the enable signal is sent from the lock loop.

9. The method of claim 6, wherein the dynamic value is a sample moving average.

10. The method of claim 1, wherein the minimum threshold is equal to or greater than a 1% phase, voltage, or frequency error.

11. The method of claim 1, wherein the voltage that is measured corresponds to a frequency or phase and the minimum threshold is a frequency or phase error threshold.

12. The method of claim 1, wherein the phase shift keyed signal with the error signal is fed through the lock loop when the phase shift keyed signal with the error signal is unable to lock.

13. The method of claim 1, wherein one frequency channel has a greater amount of power compared to the other frequency channels, thereby indicating tonal interference.

14. The method of claim 1, wherein the spectral anomaly processor automated test includes calculating a fast-moving average, a slow moving-average, or a combination thereof, calculating a moving average difference to create a stream of difference values, and comparing the stream of difference values with the minimum threshold.

15. The method of claim 1, wherein the spectral anomaly processor provides an alert to a user interface when the tonal interference voltage is detected.

16. A tonal interference detector system, comprising:

a lock loop, wherein the lock loop feeds a phase shift keyed signal with an error signal through a lock counter;

the lock counter, wherein the lock counter counts a time for the error signal to measure a voltage below a minimum threshold and sends an enable signal to the frequency channelizer module when the voltage drops below the minimum threshold;

the frequency channelizer module, wherein a frequency channelizer module splits a spectral content of the phase shift keyed signal into frequency channels and sends an output of the frequency channels to a spectral anomaly processor; and the spectral anomaly processor, wherein the spectral anomaly processor performs an automated test for each frequency channel, thereby determining a frequency or phase band of the tonal interference.

17. The system of claim 16, wherein the lock loop feeds the phase shift keyed signal with the error signal through the lock loop when the phase shift keyed signal is below the minimum threshold.

18. The system of claim 16, wherein the lock counter that counts the time for the error signal to measure the frequency or phase below the minimum threshold.

19. The system of claim 18, wherein the lock counter resets the time to zero after the error signal measures a frequency or phase below the minimum threshold when a new signal is detected or after the error signal goes above the minimum threshold.

20. The system of claim 16, wherein the frequency channelizer module and the spectral anomaly processor are powered on when the enable signal is sent from the lock counter.

* * * * *